US011248827B2

(12) United States Patent
Mimura et al.

(10) Patent No.: US 11,248,827 B2
(45) Date of Patent: Feb. 15, 2022

(54) REFRIGERANT RECOVERY MANAGEMENT SYSTEM

(71) Applicant: DAIKIN INDUSTRIES, LTD., Osaka (JP)

(72) Inventors: Mai Mimura, Osaka (JP); Kazuma Koyama, Osaka (JP); Miki Yamanaka, Osaka (JP); Satoru Fujimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/769,945

(22) PCT Filed: Dec. 4, 2018

(86) PCT No.: PCT/JP2018/044504
§ 371 (c)(1),
(2) Date: Jun. 4, 2020

(87) PCT Pub. No.: WO2019/111877
PCT Pub. Date: Jun. 13, 2019

(65) Prior Publication Data
US 2020/0309431 A1    Oct. 1, 2020

(30) Foreign Application Priority Data
Dec. 8, 2017    (JP) .............................. JP2017-236387

(51) Int. Cl.
*F25B 45/00*    (2006.01)
*F25B 49/00*    (2006.01)

(52) U.S. Cl.
CPC ............ *F25B 49/005* (2013.01); *F25B 45/00* (2013.01); *F25B 2345/002* (2013.01); *F25B 2600/05* (2013.01); *F25B 2700/04* (2013.01)

(58) Field of Classification Search
CPC .. F25B 45/00; F25B 49/005; F25B 2345/002; G06Q 10/30
See application file for complete search history.

(56) References Cited

U.S. PATENT DOCUMENTS 9,710,859 B1 * 7/2017 Theimer ................ G06Q 40/10

FOREIGN PATENT DOCUMENTS

| JP | 2002-189794 A | 7/2002 |
|----|---------------|--------|
| JP | 2003-126833 A | 5/2003 |
| JP | 2006-338363 A | 12/2006 |

(Continued)

OTHER PUBLICATIONS

International Preliminary Report of corresponding PCT Application No. PCT/JP2018/044504 dated Jun. 18, 2020.

(Continued)

*Primary Examiner* — Jonathan Bradford
(74) *Attorney, Agent, or Firm* — Global IP Counselors, LLP

(57) ABSTRACT

A refrigerant recovery management system includes a first generation unit and a second generation unit. The first generation unit generates first information to send a refrigerant recovered from refrigerant-use equipment to a refrigerant treatment practitioner that conducts refrigerant treatment on the refrigerant. The second generation unit generates second information on the refrigerant treatment, to report the refrigerant treatment to a manager that manages refrigerant recovery.

18 Claims, 8 Drawing Sheets

(56) References Cited

FOREIGN PATENT DOCUMENTS

| | | |
|---|---|---|
| JP | 2015-125672 A | 7/2015 |
| JP | 2017-72284 A | 4/2017 |

OTHER PUBLICATIONS

International Search Report of corresponding PCT Application No. PCT/JP2018/044504 dated Feb. 26, 2019.
European Search Report of corresponding EP Application No. 18 886 922.6 dated Jan. 12, 2021.

* cited by examiner

REFRIGERANT RECOVERY MANAGEMENT SYSTEM

CROSS-REFERENCE TO RELATED APPLICATIONS

This U.S. National stage application claims priority under 35 U.S.C. § 119(a) to Japanese Patent Application No. 2017-236387, filed in Japan on Dec. 8, 2017, the entire contents of which are hereby incorporated herein by reference.

BACKGROUND

Field of the Invention

A refrigerant recovery management system configured to manage refrigerant recovery.

Background Information

There has been publicly known a refrigerant recovery apparatus configured to recover a refrigerant for use in a cold storage apparatus, a refrigeration apparatus, or an air conditioning apparatus. For example, JP 2017-72284 A discloses a refrigerant recovery apparatus.

SUMMARY

However, refrigerant recovery is not managed.

A refrigerant recovery management system according to a first aspect includes a first generation unit and a second generation unit. The first generation unit generates first information for sending a refrigerant recovered from refrigerant-use equipment to a refrigerant treatment practitioner that conducts refrigerant treatment on the refrigerant. The second generation unit generates second information on the refrigerant treatment, for reporting the refrigerant treatment to a manager that manages refrigerant recovery.

A refrigerant recovery management system according to a second aspect is the refrigerant recovery management system according to the first aspect, wherein the refrigerant treatment includes at least recycle of the refrigerant, destruction of the refrigerant, and storage for the destruction of the refrigerant.

A refrigerant recovery management system according to a third aspect is the refrigerant recovery management system according to the first or second aspect, wherein each of the first information and the second information contains at least information on an amount of the refrigerant.

A refrigerant recovery management system according to a fourth aspect is the refrigerant recovery management system according to any of the first to third aspects, wherein the first information further contains information on identification of refrigerant recovery equipment for sending the refrigerant to the refrigerant treatment practitioner, and information on a type of the refrigerant.

A refrigerant recovery management system according to a fifth aspect is the refrigerant recovery management system according to any of the first to fourth aspects, wherein the first information further contains information on identification of a refrigerant recovery practitioner that sends the recovered refrigerant to the refrigerant treatment practitioner.

A refrigerant recovery management system according to a sixth aspect is the refrigerant recovery management system according to any of the first to fifth aspects, wherein the second information further contains information on the refrigerant treatment practitioner that conducts the refrigerant treatment on the refrigerant.

A refrigerant recovery management system according to a seventh aspect is the refrigerant recovery management system according to any of the first to sixth aspects, further including a conformity determination unit. The conformity determination unit determines conformity between the first information and the second information.

A refrigerant recovery management system according to an eighth aspect is the refrigerant recovery management system according to the seventh aspect, further including a first allocation unit. The first allocation unit allocates a consideration for the refrigerant recovery performed this time from a consideration for refrigerant recovery accumulated by the manager, based on a determination by the conformity determination unit.

A refrigerant recovery management system according to a ninth aspect is the refrigerant recovery management system according to the eighth aspect, further including a second allocation unit. The second allocation unit allocates the consideration for the refrigerant recovery allocated by the first allocation unit, to the refrigerant recovery practitioner and the refrigerant treatment practitioner.

DETAILED DESCRIPTION OF EMBODIMENT(S)

(1) General Configuration

Figure 1:
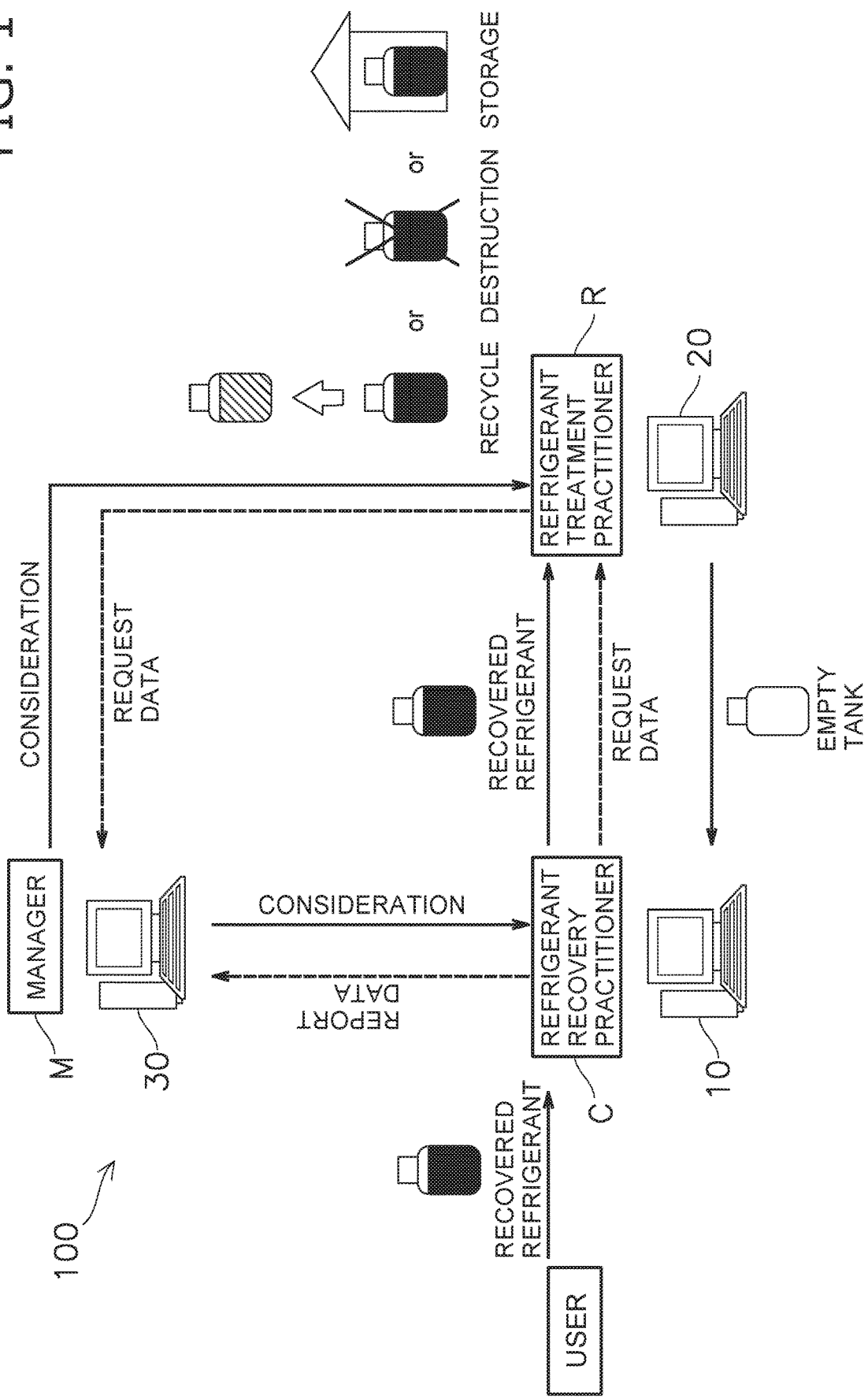
FIG. 1 is a schematic diagram of a configuration of a refrigerant recovery management system.

With reference to FIG. 1, a description will be given of a configuration of a refrigerant recovery management system 100. FIG. 1 schematically illustrates the configuration of the refrigerant recovery management system 100.

In the present embodiment, the refrigerant recovery management system 100 is configured to manage refrigerant recovery in a country or a region. For example, the region may be a broader region on a prefectural basis or may be a narrower region on a municipal basis.

The refrigerant recovery involves recovering a refrigerant from refrigerant-use equipment and subjecting the recovered refrigerant to refrigerant treatment. The refrigerant-use equipment refers to equipment that uses a refrigerant, such as a cold storage apparatus, a refrigeration apparatus, or an air conditioning apparatus. The refrigerant treatment includes recycle of a refrigerant, destruction of a refrigerant, and storage for destruction of a refrigerant. Examples of the refrigerant may include, but not limited to, chlorofluorocarbons, hydrofluorocarbons, and next-generation refrigerants.

The country or region that constructs the refrigerant recovery management system 100 has a refrigerant recovery practitioner C, a refrigerant treatment practitioner R, and a manager M. The refrigerant recovery management system 100 includes a recovery server 10 of the refrigerant recovery practitioner C, a treatment server 20 of the refrigerant treatment practitioner R, a management server 30 of the manager M, and a network connecting these servers to one another.

The recovery server 10, the treatment server 20, and the management server 30 are server computers that effect data accumulation, data processing, network relay or network management, and others.

The refrigerant recovery practitioner C is an organization or an individual that recovers a refrigerant from refrigerant-use equipment of a user. The refrigerant recovery practitioner C may be, for example, an installation company, a facilities supplier, or a service person of a manufacturer. The present embodiment describes a single refrigerant recovery practitioner C; however, the refrigerant recovery management system 100 may have a plurality of refrigerant recovery practitioners C.

The refrigerant recovery practitioner C recovers a refrigerant from refrigerant-use equipment of a user in, for example, disposal, repairing, or installing the refrigerant-use equipment. The refrigerant recovery practitioner C then fills a tank as refrigerant recovery equipment with the refrigerant recovered from the user, and sends the tank filled with the recovered refrigerant to the refrigerant treatment practitioner R. At this time, the recovery server 10 of the refrigerant recovery practitioner C transmits request data as first information on refrigerant treatment, to the treatment server 20 of the refrigerant treatment practitioner R. The recovery server 10 of the refrigerant recovery practitioner C also transmits report data as second information on the refrigerant treatment, to the management server 30 of the manager M. A specific description on the request data and report data will be given later.

The refrigerant treatment practitioner R is an organization or an individual that conducts refrigerant treatment on a recovered refrigerant. The refrigerant treatment practitioner R conducts at least one of recycle of a refrigerant, destruction of a refrigerant, or storage for destruction of a refrigerant. The refrigerant treatment practitioner R may be, for example, a company treating industrial waste, a resource recycling company, or a department engaged in refrigerant treatment in a manufacturer. The present embodiment describes a single refrigerant treatment practitioner R; however, the refrigerant recovery management system 100 may have a plurality of refrigerant treatment practitioners R.

The refrigerant treatment practitioner R conducts the refrigerant treatment on the recovered refrigerant sent from the refrigerant recovery practitioner C. After the refrigerant treatment practitioner R conducts the refrigerant treatment on the recovered refrigerant sent from the refrigerant recovery practitioner C, the treatment server 20 of the refrigerant treatment practitioner R transfers the request data as the first information to the management server 30 of the manager M. In addition, the refrigerant treatment practitioner R sends the tank in which the refrigerant subjected to the refrigerant treatment was stored (i.e., the empty tank), to the refrigerant recovery practitioner C.

The manager M is an organization or an individual that gives a consideration for refrigerant recovery in a country or region. The manager M may be, for example, a government or municipal institution. The manager M accumulates a refrigerant recovery fund. The refrigerant recovery fund is, for example, a fund to be allocated as a budget every year in a country or a region and to be paid as a consideration for refrigerant recovery. The management server 30 determines conformity between the report data transmitted from the refrigerant recovery practitioner C and the request data transferred from the refrigerant treatment practitioner R. The management server 30 then calculates a consideration for refrigerant recovery to be given to each of the refrigerant recovery practitioner C and the refrigerant treatment practitioner R, based on a result of the determination.

The refrigerant recovery practitioner C is an owner of the tank. That is, the refrigerant recovery practitioner C fills the tank of its own with the refrigerant recovered from the user, and sends the tank filled with the recovered refrigerant to the refrigerant treatment practitioner R. The refrigerant treatment practitioner R conducts refrigerant treatment on the refrigerant in the tank, and then sends the empty tank back to the refrigerant recovery practitioner. The tank is provided with a tag on which an identification number of the tank (i.e., a tank ID) is written down.

In cases where the refrigerant treatment is the recycle of the refrigerant, the refrigerant treatment practitioner R sends the tank filled with the recycled refrigerant to a refrigerant filler. The refrigerant filler is an organization or an individual that fills refrigerant-use equipment of a user with a recycled refrigerant in a country or a region. In this case, the refrigerant recovery practitioner C may be the same as the refrigerant filler.

In cases where, for example, there is no recyclable refrigerant, a recycled refrigerant has poor quality, or a recycled refrigerant is expensive, the refrigerant filler purchases a new refrigerant from a refrigerant dealer, and fills the tank with the purchased refrigerant. The refrigerant dealer is an organization or an individual that imports or sells a new refrigerant.

(2) Specific Configuration (2-1) Recovery Server, Treatment Server

Figure 2:
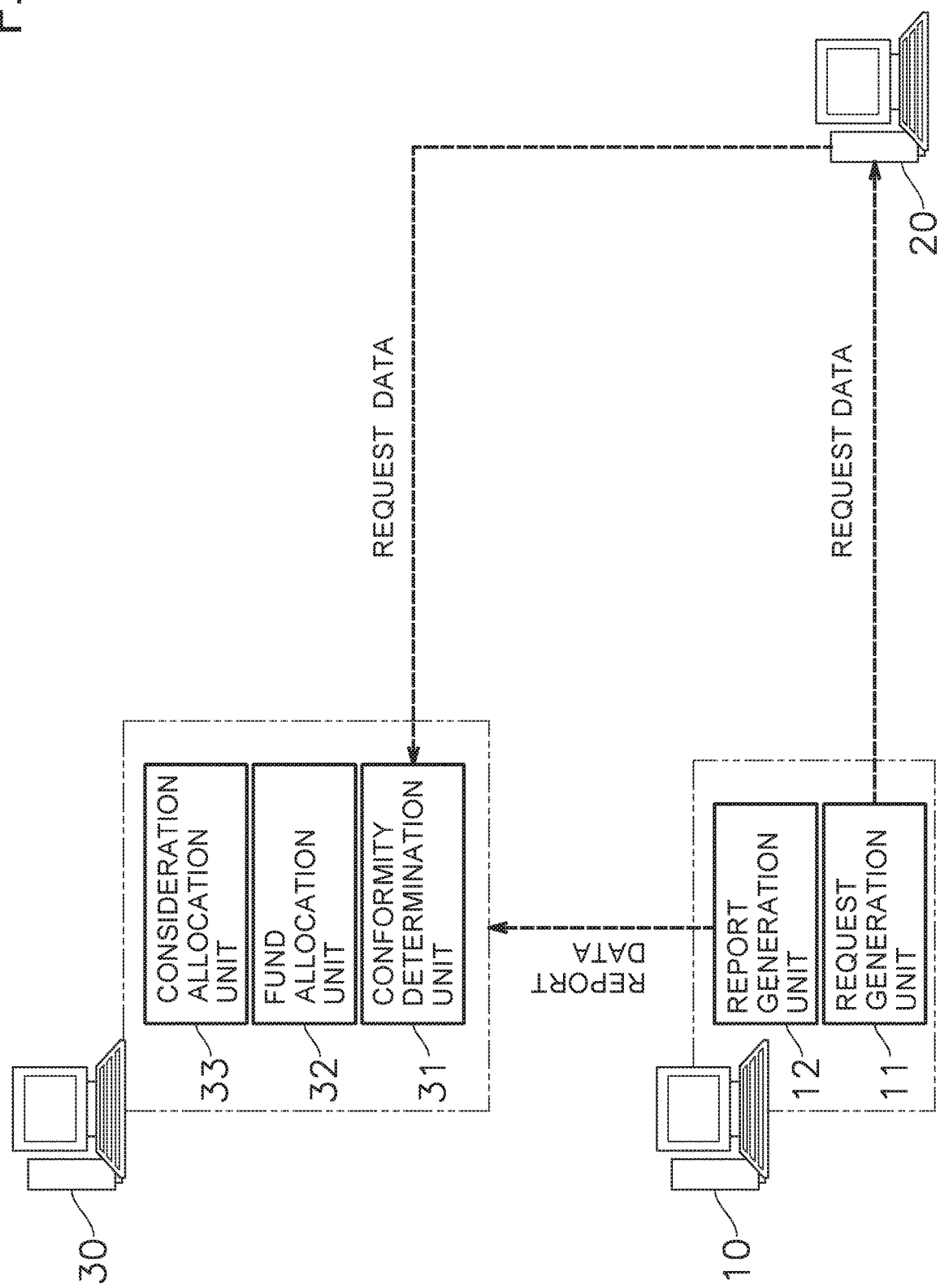
FIG. 2 is a schematic diagram of configurations of a recovery server and a management server.

With reference to FIG. 2, a description will be given of the recovery server 10 and the treatment server 30. FIG. 2 schematically illustrates a configuration of the recovery server 10.

The recovery server 10 is a server computer of the refrigerant recovery practitioner C. The recovery server 10 includes a request generation unit 11 as a first generation unit and a report generation unit 12 as a second generation unit.

The request generation unit 11 generates request data as first information. The recovery server 10 transmits to the treatment server 20 the request data generated by the request generation unit 11.

After refrigerant treatment is conducted based on the request data transmitted from the recovery server 10, the treatment server 20 transfers to the management server 30 the request data transmitted from the recovery server 10. The treatment server 20 transfers the request data to the management server 30 after the refrigerant treatment practitioner R conducts the refrigerant treatment. Therefore, the management server 30 that receives the request data from the treatment server 20 sets a flag indicating completion of the refrigerant treatment based on the request data. As described above, the request data transmitted from the recovery server 10 to the treatment server 20 is transferred as it is from the treatment server 20 to the management server 30. Alternatively, before the transfer of the request data from the treatment server 20 to the management server 30, the treatment server 20 may add information indicating the completion of the refrigerant treatment to the request data and transfer the request data to the management server 30.

The report generation unit 12 of the recovery server 10 generates report data. The recovery server 10 transmits to the management server 30 the report data generated by the report generation unit 12.

(2-2) Management Server

With reference to FIG. 2, a description will be given of a configuration of the management server 30. FIG. 2 schematically illustrates the configuration of the management server 30.

The management server 30 is a server computer of the manager M. The management server 30 includes a conformity determination unit 31, a fund allocation unit 32 as a first allocation unit, and a consideration allocation unit 33 as a second allocation unit.

The conformity determination unit 31 determines conformity between the report data transmitted from the recovery server 10 and the request data transferred from the treatment server 20. For example, from a comparison between the report data and the request data, the conformity determination unit 31 determines whether a refrigerant recovery practitioner ID of a refrigerant recovery practitioner C in the request data agrees with a refrigerant recovery practitioner ID of the refrigerant recovery practitioner C that transmitted the report data. The conformity determination unit 31 also determines whether a refrigerant treatment practitioner ID of the refrigerant treatment practitioner R that transferred the request data agrees with a refrigerant treatment practitioner ID of a refrigerant treatment practitioner R in the report data. The conformity determination unit 31 also determines whether a refrigerant type in the report data agrees with a refrigerant type in the request data. The conformity determination unit 31 also determines whether a weight of refrigerant in the report data agrees with a weight of refrigerant in the request data.

The fund allocation unit 32 allocates a consideration for the refrigerant recovery performed this time from the refrigerant recovery fund of the manager M, based on the determination by the conformity determination unit 31. For example, when the conformity determination unit 31 determines that the contents of the report data agree with the contents of the request data, the fund allocation unit 32 calculates a ratio of an amount of the refrigerant recovered this time to target amounts of refrigerants to be recovered in this year, and sets the ratio of the refrigerant recovery fund at a consideration for the refrigerant recovery performed this time. In cases where the manager M is, for example, a government or municipal institution, the refrigerant recovery fund of the manager M corresponds to a grant from the government or a fund for promoting refrigerant recovery.

The consideration allocation unit 33 allocates the consideration for the refrigerant recovery performed this time, the consideration being allocated by the fund allocation unit 32, to a consideration to be given to the refrigerant recovery practitioner C and a consideration to be given to the refrigerant treatment practitioner R. A ratio between the consideration to be given to the refrigerant recovery practitioner C and the consideration to be given to the refrigerant treatment practitioner R may be fixed depending on a country or a region or may differ depending on a combination between the refrigerant recovery practitioner C and the refrigerant treatment practitioner R.

(2-3) Request Data

Figure 3:
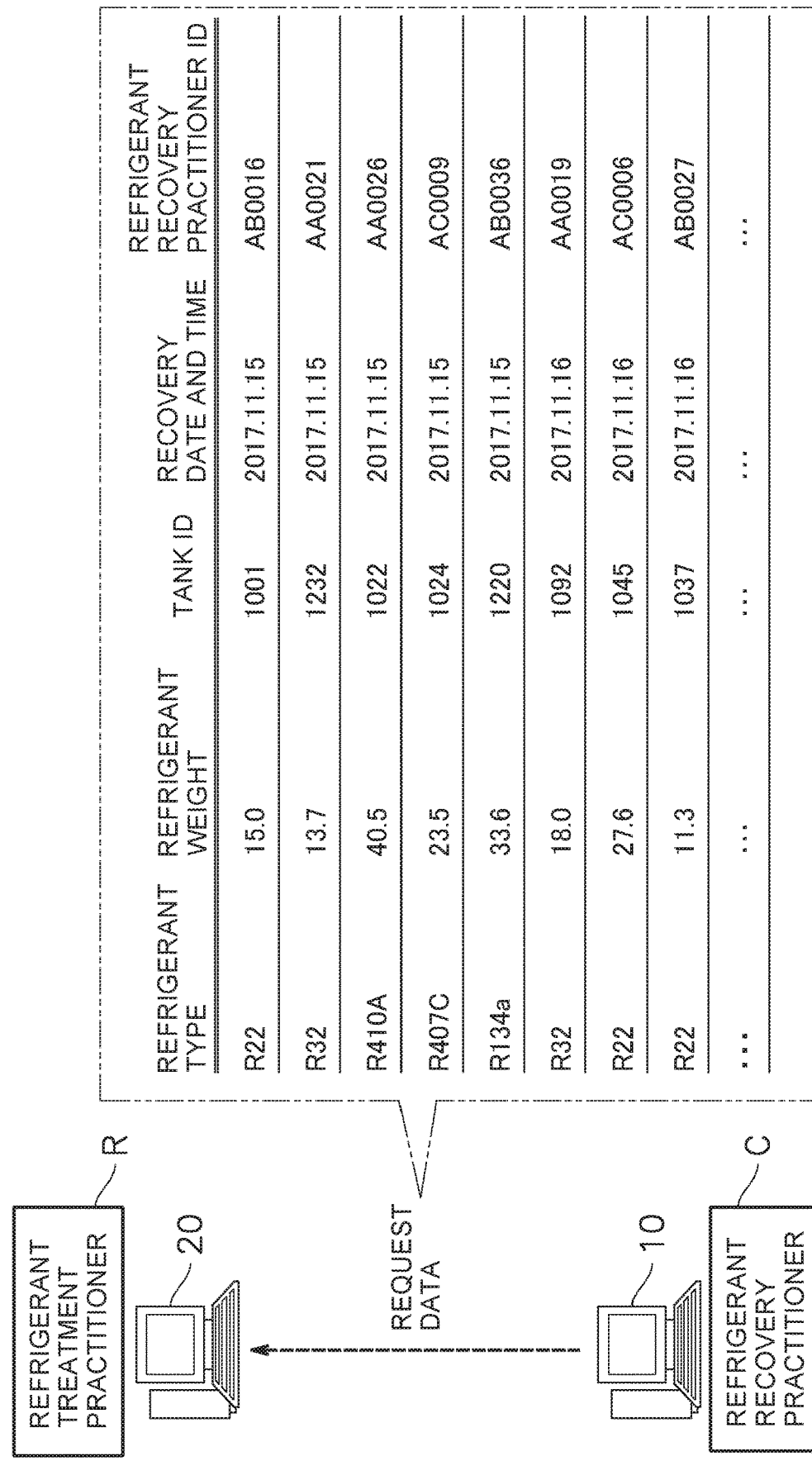
FIG. 3 is a table of request data.

With reference to FIG. 3, a description will be given of the request data. FIG. 3 illustrates the request data in the form of a table.

The request data as the first information is data for sending the refrigerant recovered from the refrigerant-use equipment by the refrigerant recovery practitioner C, from the refrigerant recovery practitioner C to the refrigerant treatment practitioner R. After the refrigerant recovery, the refrigerant recovery practitioner C inputs the request data to the recovery server 10. Specifically, a data input program executable by the recovery server 10 presents, for example, a screen for selecting a refrigerant type, a screen for entering a numerical value of a weight of refrigerant, a screen for selecting a tank ID, and a screen for selecting a recovery date and time, to workers in the refrigerant recovery practitioner C. The request data illustrated in FIG. 3 contains the details thus input and an ID of the person who inputted the details (e.g., the refrigerant recovery practitioner ID) associated with the details. The recovery server 10 transmits the request data to the treatment server 20 in the form of electronic data. The refrigerant treatment practitioner R conducts refrigerant treatment based on the request data thus transmitted to the treatment server 20.

The request data contains, as to a tank filled with a refrigerant to be subjected to refrigerant treatment, a type of the refrigerant, a weight (unit: kg) of the refrigerant as information on an amount of the refrigerant, an identification number of the tank (i.e., a tank ID) as information on identification of refrigerant recovery equipment, an actual date and time of refrigerant recovery, and an identification number of a refrigerant recovery practitioner C (i.e., a refrigerant recovery practitioner ID) as information on identification of the refrigerant recovery practitioner C.

Preferably, the request data is transmitted from the recovery server 10 to the treatment server 20 before the recovered refrigerant is actually sent to the refrigerant treatment practitioner R. In addition, the request data may be transmitted from the recovery server 10 to the treatment server 20 for each request (for each tank filled with a recovered refrigerant). Alternatively, the request data may be transmitted from the recovery server 10 to the treatment server 20 for each day.

(2-4) Report Data

Figure 4:
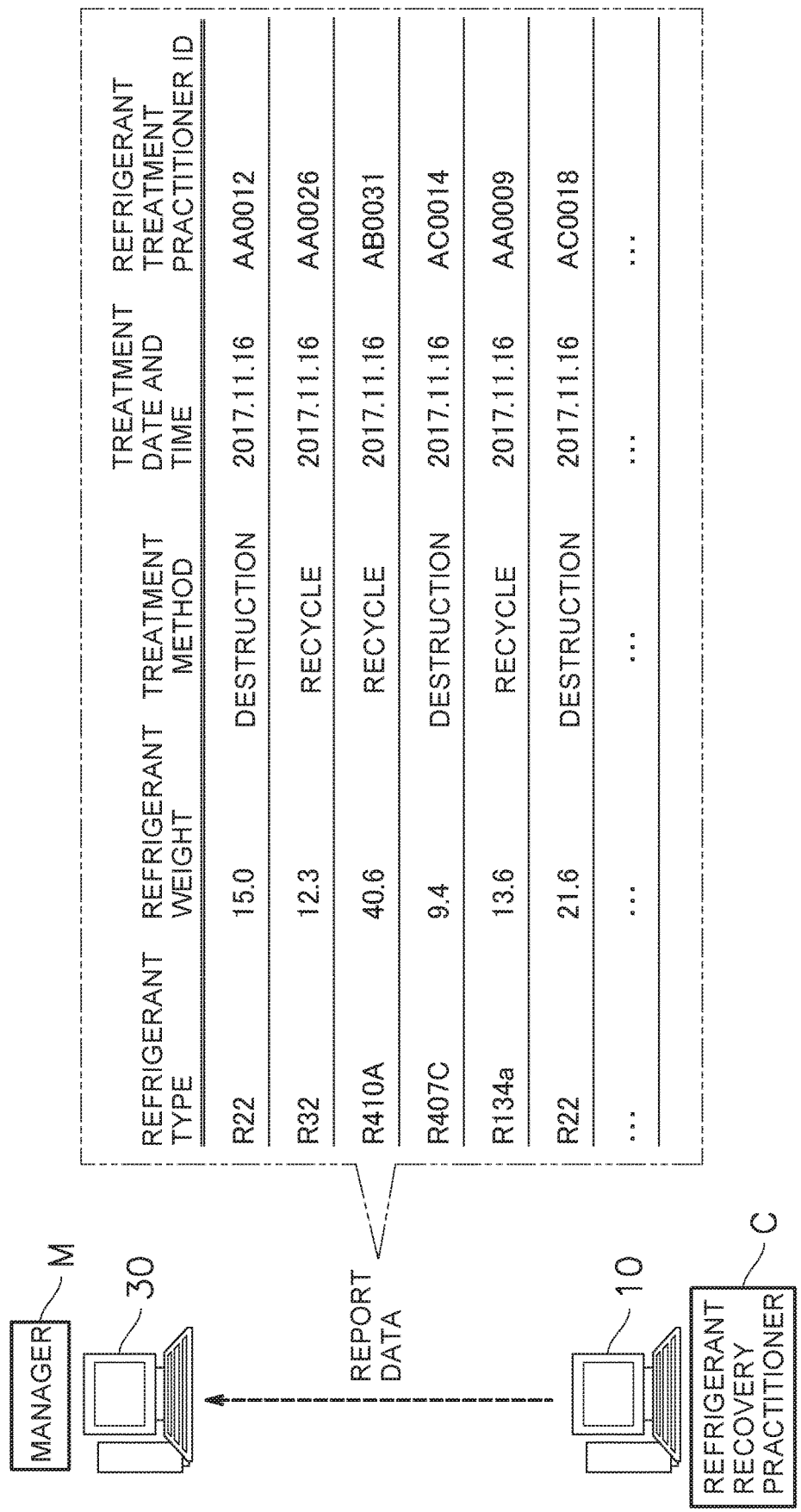
FIG. 4 is a table of report data.

With reference to FIG. 4, a description will be given of the report data. FIG. 4 illustrates the report data in the form of a table.

The report data as the second information is data concerning refrigerant treatment, for reporting the refrigerant treatment to the manager M. The recovery server 10 transmits the report data to the management server 30 in the form of electronic data. The manager M pays for the refrigerant recovery from the refrigerant recovery fund, based on the report data.

The report data contains, as to a refrigerant for which the refrigerant recovery practitioner C issued a request of refrigerant treatment to the refrigerant treatment practitioner R, a type of the refrigerant, a weight (unit: kg) of the refrigerant as information on an amount of the refrigerant, a treatment method that is one of recycle of the refrigerant, destruction of the refrigerant, and storage for the destruction of the refrigerant, a date and time of the refrigerant treatment, and an identification number of a refrigerant treatment practitioner R (i.e., a refrigerant treatment practitioner ID) as information on identification of a refrigerant treatment practitioner R that conducted the refrigerant treatment. The report data may be generated by the refrigerant recovery practitioner C after the refrigerant treatment practitioner R conducts the refrigerant treatment. Alternatively, the report data may be generated at the time when the refrigerant recovery practitioner C issues the request of the refrigerant treatment to the refrigerant treatment practitioner R.

Preferably, the transmission of the report data from the recovery server 10 to the management server 30 and the transmission of the request data from the recovery server 10 to the treatment server 20 are made at substantially the same time. In addition, the report data may be transmitted from the recovery server 10 to the management server 30 for each request (for each tank filled with a recovered refrigerant). Alternatively, the report data may be transmitted from the recovery server 10 to the management server 30 for each day.

(3) Advantageous Effects

With the configuration described above, the refrigerant recovery practitioner C receives a consideration for a recovered refrigerant for which the refrigerant recovery practitioner C issued a request of refrigerant treatment. At the same time, the refrigerant treatment practitioner R also receives a consideration for the recovered refrigerant on which the refrigerant treatment practitioner R conducted the refrigerant treatment. The manager M pays for only a recovered refrigerant on which refrigerant treatment was actually conducted.

This configuration thus enables management of refrigerant recovery including refrigerant treatment in a country or a region, avoidance of the destruction of ozone, and reduction in adverse effects leading to global warming.

(4) Features (4-1)

There has been publicly known a refrigerant recovery apparatus configured to recover a refrigerant for use in a cold storage apparatus, a refrigeration apparatus, or an air conditioning apparatus. However, refrigerant recovery is not managed.

A refrigerant recovery management system 100 includes a request generation unit 11 and a report generation unit 12. The request generation unit 11 generates request data for sending a refrigerant recovered from refrigerant-use equipment to a refrigerant treatment practitioner R that conducts refrigerant treatment on the refrigerant. The report generation unit 12 generates report data on the refrigerant treatment, for reporting the refrigerant treatment to a manager M that manages refrigerant recovery.

This configuration thus enables management of refrigerant recovery, avoidance of the destruction of ozone layer, and reduction in adverse effects leading to global warming.

(4-2)

In the refrigerant recovery management system 100, the refrigerant treatment includes at least recycle of the refrigerant, destruction of the refrigerant, and storage for the destruction of the refrigerant.

(4-3)

In the refrigerant recovery management system 100, each of the request data and the report data contains at least information on an amount of the refrigerant.

(4-4)

In the refrigerant recovery management system 100, the request data further contains information on identification of refrigerant recovery equipment (e.g., a tank) for sending the refrigerant to the refrigerant treatment practitioner R, and information on a type of the refrigerant.

(4-5)

In the refrigerant recovery management system 100, the request data further contains information on identification of a refrigerant recovery practitioner C that sends the recovered refrigerant to the refrigerant treatment practitioner R.

(4-6)

In the refrigerant recovery management system 100, the report data further contains information on the refrigerant treatment practitioner R that conducts the refrigerant treatment on the refrigerant.

(4-7)

The refrigerant recovery management system 100 further includes a conformity determination unit 31. The conformity determination unit 31 determines conformity between the request data and the report data.

(4-8)

The refrigerant recovery management system 100 further includes a fund allocation unit 32. The fund allocation unit 32 reports the determination by the conformity determination unit 31 to the manager M, and allocates a consideration for the refrigerant recovery performed this time from a consideration for refrigerant recovery accumulated by the manager M, based on the determination.

(4-9)

The refrigerant recovery management system 100 further includes a consideration allocation unit 33. The consideration allocation unit 33 allocates the consideration for the refrigerant recovery allocated by the fund allocation unit 32, to the refrigerant recovery practitioner C and the refrigerant treatment practitioner R.

(5) Modifications (5-1) Modification 1A

Figure 5:
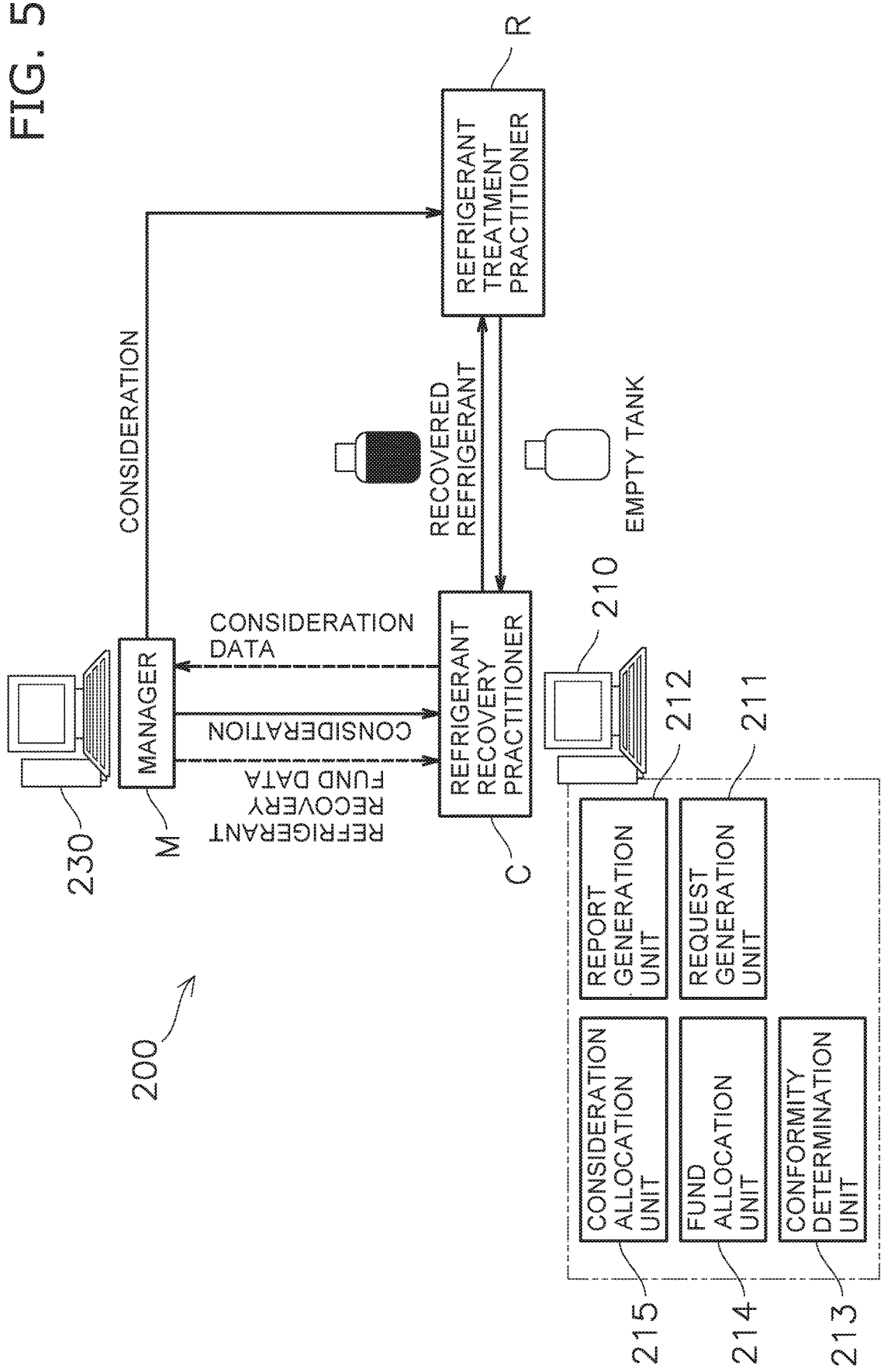
FIG. 5 is a schematic diagram of a configuration of a refrigerant recovery management system according to Modification 1A.

With reference to FIG. 5, a description will be given of a refrigerant recovery management system 200 according to Modification 1A. FIG. 5 schematically illustrates a configuration of the refrigerant recovery management system 200.

A country or a region that constructs the refrigerant recovery management system 200 has a refrigerant recovery practitioner C, a refrigerant treatment practitioner R, and a manager M. The roles of the refrigerant recovery practitioner C, refrigerant treatment practitioner R, and manager M are similar to those described in the foregoing embodiment; therefore, the description thereof will not be given here. In addition, a flow of a tank filled with a recovered refrigerant and a flow of a consideration are also similar to those described in the foregoing embodiment, therefore, the description thereof will not be given here.

The refrigerant recovery management system 200 includes only a recovery server 210 of the refrigerant recovery practitioner C. The recovery server 210 effects data accumulation, data processing, network relay or network management, and others. The recovery server 210 is connected to a management server 230 via a network.

The recovery server 210 includes a request generation unit 211 as a first generation unit, a report generation unit 212 as a second generation unit, a conformity determination unit 213, a fund allocation unit 214 as a first allocation unit, and a consideration allocation unit 215 as a second allocation unit. The recovery server 210 has the request generation unit 211 and the report generation unit 212, similarly to those described in the foregoing embodiment; therefore, the description thereof will not be given here.

The conformity determination unit 213 determines conformity between request data as first information generated by the request generation unit 211 and report data as second information generated by the report generation unit 212.

The fund allocation unit 214 allocates a consideration for a refrigerant recovery performed this time, from refrigerant recovery fund data as information on a refrigerant recovery fund transmitted from the management server 230, based on the determination by the conformity determination unit 213.

The consideration allocation unit 215 allocates the consideration for the refrigerant recovery performed this time, the consideration being allocated by the fund allocation unit 214, to a consideration to be given to the refrigerant recovery practitioner C and a consideration to be given to the refrigerant treatment practitioner R. Consideration data as information on allocation of a consideration is transmitted to the management server 230.

According to this configuration, it is possible to embody the refrigerant recovery management system 200 by only the recovery server 210 of the refrigerant recovery practitioner C.

(5-2) Modification 1B

Figure 6:
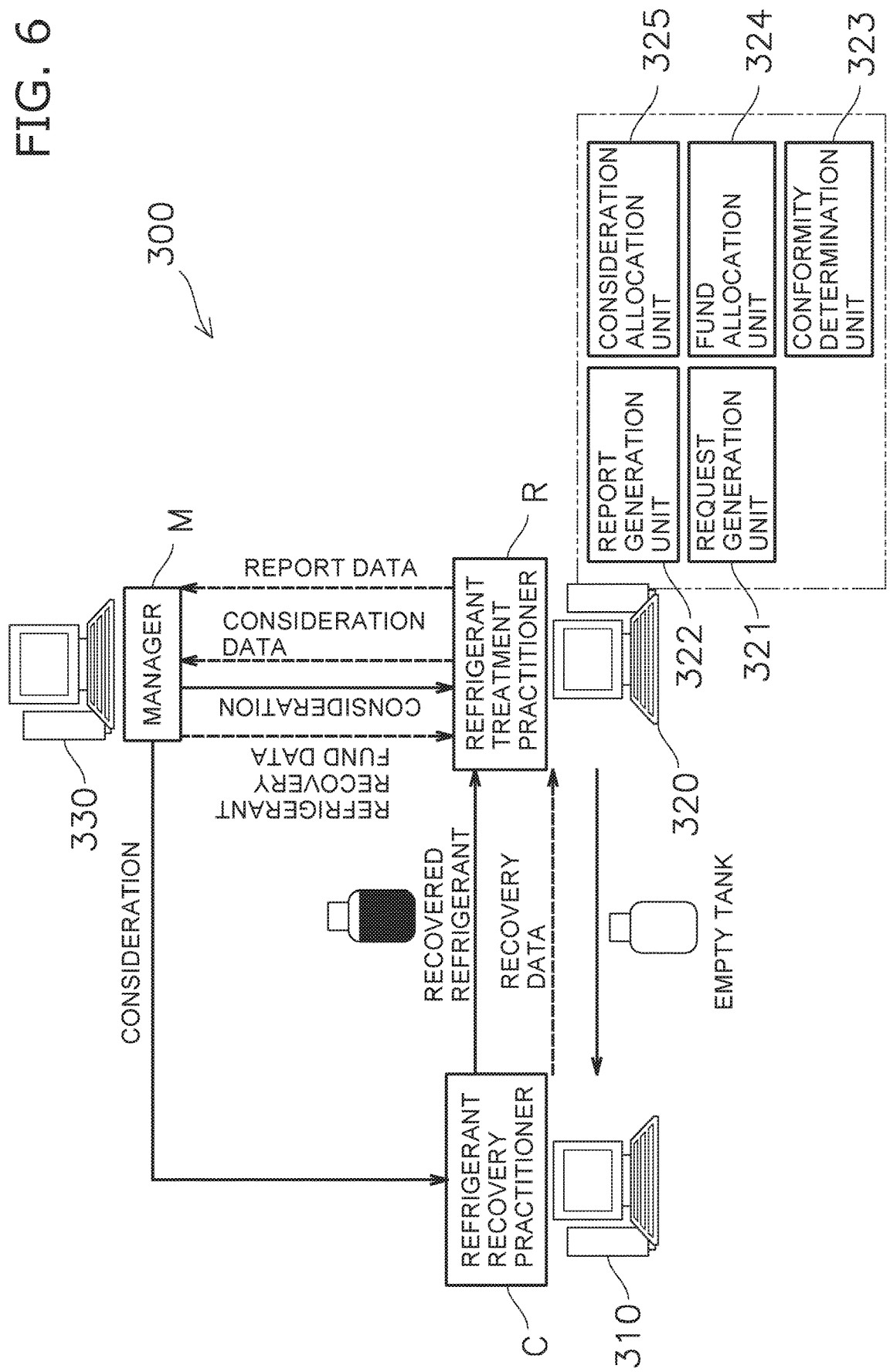
FIG. 6 is a schematic diagram of a configuration of a refrigerant recovery management system according to Modification 1B.

With reference to FIG. 6, a description will be given of a refrigerant recovery management system 300 according to Modification 1B. FIG. 6 schematically illustrates a configuration of the refrigerant recovery management system 300.

A country or a region that constructs the refrigerant recovery management system 300 has a refrigerant recovery practitioner C, a refrigerant treatment practitioner R, and a manager M. The roles of the refrigerant recovery practitioner C, refrigerant treatment practitioner R, and manager M are similar to those described in the foregoing embodiment; therefore, the description thereof will not be given here. In addition, a flow of a tank filled with a recovered refrigerant and a flow of a consideration are also similar to those described in the foregoing embodiment, therefore, the description thereof will not be given here.

The refrigerant recovery management system 300 includes only a treatment server 320 of the refrigerant treatment practitioner R. The treatment server 320 effects data accumulation, data processing, network relay or network management, and others. The treatment server 320 is connected to a recovery server 310 and a management server 330 via a network.

The treatment server 320 includes a request generation unit 321 as a first generation unit, a report generation unit 322 as a second generation unit, a conformity determination unit 323, a fund allocation unit 324 as a first allocation unit, and a consideration allocation unit 325 as a second allocation unit.

The request generation unit 321 generates request data as first information based on recovery data transmitted from the recovery server 310. The recovery data contains items contained in the request data described in the foregoing embodiment.

The report generation unit 322 generates report data as second information based on the recovery data transmitted from the recovery server 310. The treatment server 320 transmits the report data thus generated to the management server 330.

The conformity determination unit 323 determines conformity between the request data generated by the request generation unit 321 and the report data generated by the report generation unit 322.

The fund allocation unit 324 allocates a consideration for a refrigerant recovery performed this time, from refrigerant recovery fund data as information on a refrigerant recovery fund transmitted from the management server 330, based on the determination by the conformity determination unit 323.

The consideration allocation unit 325 allocates the consideration for the refrigerant recovery performed this time, the consideration being allocated by the fund allocation unit 324, to a consideration to be given to the refrigerant recovery practitioner C and a consideration to be given to the refrigerant treatment practitioner R. Consideration data as information on allocation of a consideration is transmitted to the management server 330.

According to this configuration, it is possible to embody the refrigerant recovery management system 300 by only the treatment server 320 of the refrigerant treatment practitioner R.

(5-3) Modification 1C

Figure 7:
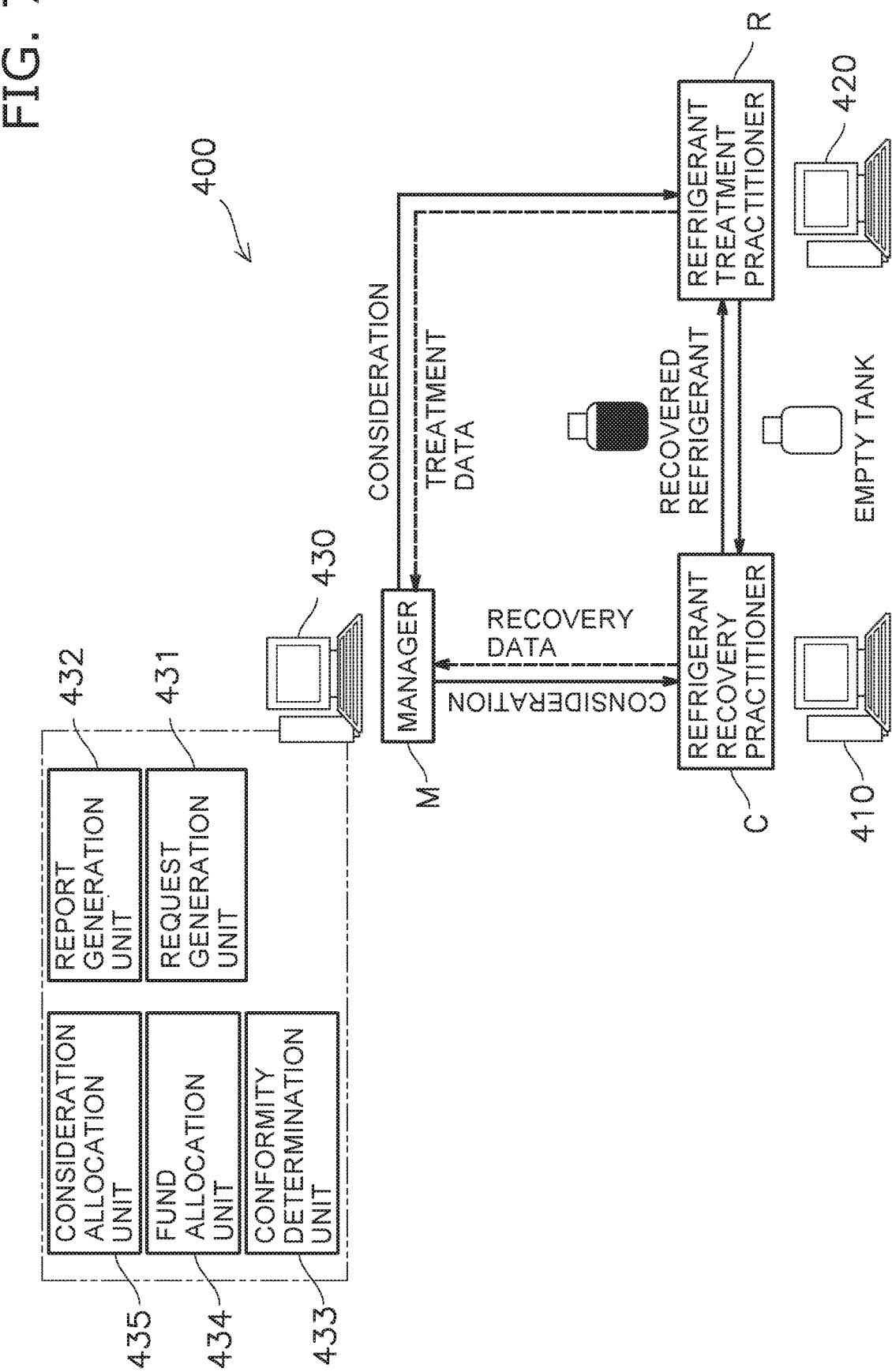
FIG. 7 is a schematic diagram of a configuration of a refrigerant recovery management system according to Modification 1C.

With reference to FIG. 7, a description will be given of a refrigerant recovery management system 400 according to Modification 1C. FIG. 7 schematically illustrates a configuration of the refrigerant recovery management system 400.

A country or a region that constructs the refrigerant recovery management system 400 has a refrigerant recovery practitioner C, a refrigerant treatment practitioner R, and a manager M. The roles of the refrigerant recovery practitioner C, refrigerant treatment practitioner R, and manager M are similar to those described in the foregoing embodiment; therefore, the description thereof will not be given here. In addition, a flow of a tank filled with a recovered refrigerant and a flow of a consideration are also similar to those described in the foregoing embodiment; therefore, the description thereof will not be given here.

The refrigerant recovery management system 400 includes only a management server 430 of the manager M. The management server 430 effects data accumulation, data processing, network relay or network management, and others. The management server 430 is connected to a recovery server 410 and a treatment server 420 via a network.

The management server 430 includes a request generation unit 431 as a first generation unit, a report generation unit 432 as a second generation unit, a conformity determination unit 433, a fund allocation unit 434 as a first allocation unit, and a consideration allocation unit 435 as a second allocation unit. The management server 430 has the conformity determination unit 433, the fund allocation unit 434, and the consideration allocation unit 435, similarly to those described in the foregoing embodiment; therefore, the description thereof will not be given here.

The request generation unit 431 generates request data as first information based on recovery data transmitted from the recovery server 410. The recovery data contains items contained in the request data described in the foregoing embodiment.

The report generation unit 432 generates report data as second information based on the recovery data transmitted from the recovery server 410.

The treatment server 420 transmits treatment data to the management server 430. The treatment data contains items contained in the request data transferred from the treatment server 20 to the management server 30 after the refrigerant treatment in the foregoing embodiment.

According to this configuration, it is possible to embody the refrigerant recovery management system 400 by only the management server 430 of the manager M.

(5-4) Modification 1D

Figure 8:
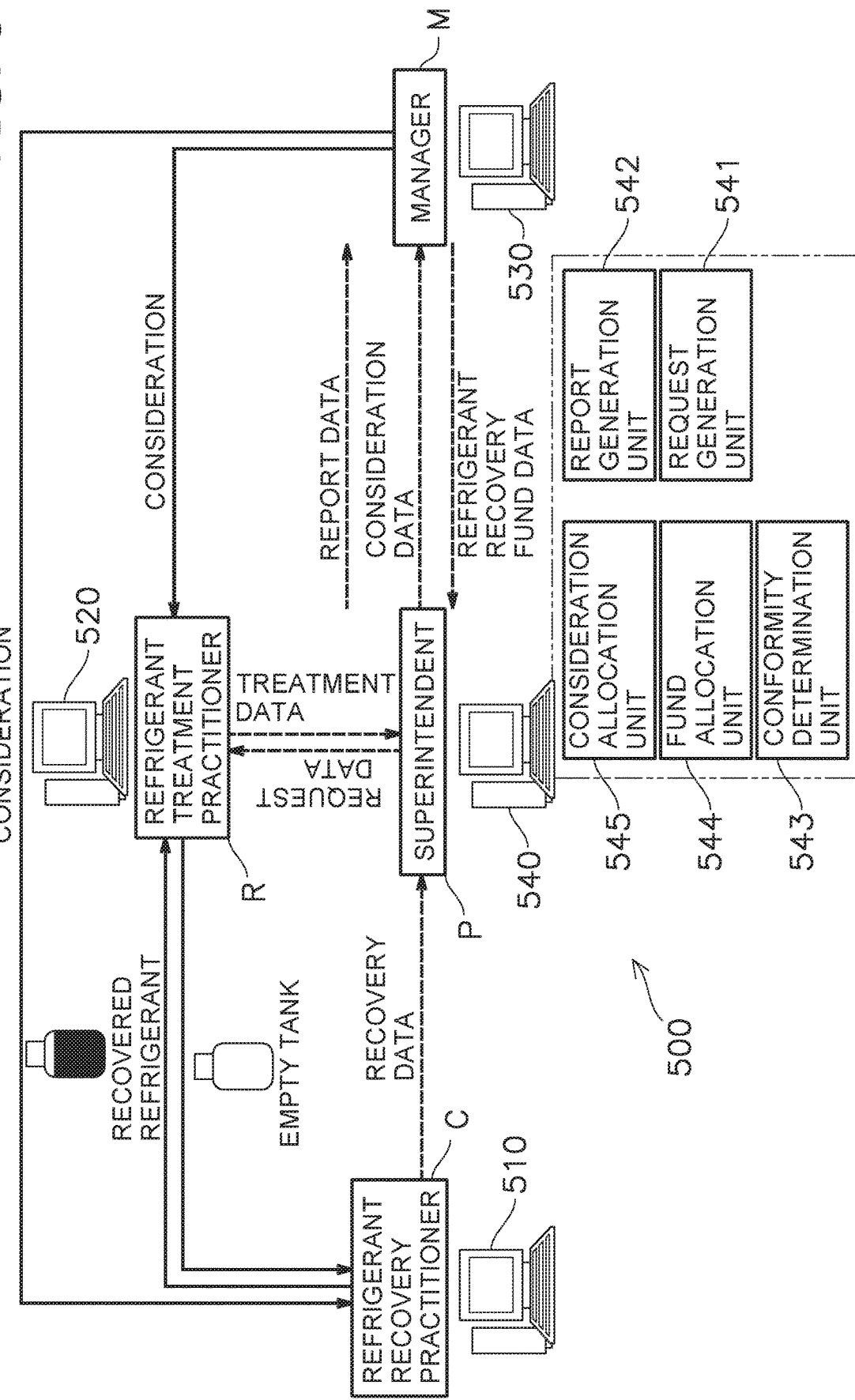
FIG. 8 is a schematic diagram of a configuration of a refrigerant recovery management system according to Modification 1D.

With reference to FIG. 8, a description will be given of a refrigerant recovery management system 500 according to Modification 1D. FIG. 8 schematically illustrates a configuration of the refrigerant recovery management system 500.

A country or a region that constructs the refrigerant recovery management system 500 has a refrigerant recovery practitioner C, a refrigerant treatment practitioner R, a manager M, and a superintendent P. The roles of the refrigerant recovery practitioner C, refrigerant treatment practitioner R, and manager M are similar to those described in the foregoing embodiment; therefore, the description thereof will not be given here. In addition, a flow of a tank filled with a recovered refrigerant and a flow of a consideration are also similar to those described in the foregoing embodiment; therefore, the description thereof will not be given here.

The superintendent P is an organization or an individual that superintends the refrigerant recovery practitioner C, the refrigerant treatment practitioner R, and the manager M. The superintendent P may be, for example, a government or municipal institution. The superintendent P has a superintendence server 540.

The refrigerant recovery management system 500 includes only the superintendence server 540 of the superintendent P. The superintendence server 540 effects data accumulation, data processing, network relay or network management, and others. The superintendence server 540 is connected to a recovery server 510, a treatment server 520, and a management server 530 via a network.

The superintendence server 540 includes a request generation unit 541 as a first generation unit, a report generation unit 542 as a second generation unit, a conformity determination unit 543, a fund allocation unit 544 as a first allocation unit, and a consideration allocation unit 545 as a second allocation unit.

The request generation unit 541 generates request data as first information based on recovery data transmitted from the recovery server 510. The recovery data contains items contained in the request data described in the foregoing embodiment. The superintendence server 540 transmits the request data thus generated to the treatment server 520.

The report generation unit 542 generates report data as second information based on the recovery data transmitted from the recovery server 510. The superintendence server 540 transmits the report data thus generated to the management server 530.

The conformity determination unit 543 determines conformity between the request data generated by the request generation unit 541 and the report data generated by the report generation unit 542.

The fund allocation unit 544 allocates a consideration for a refrigerant recovery performed this time, from refrigerant recovery fund data as information on a refrigerant recovery fund transmitted from the management server 530, based on the determination by the conformity determination unit 543.

The consideration allocation unit 545 allocates the consideration for the refrigerant recovery performed this time, the consideration being allocated by the fund allocation unit 544, to a consideration to be given to the refrigerant recovery practitioner C and a consideration to be given to the refrigerant treatment practitioner R. Consideration data as information on allocation of a consideration is transmitted to the management server 530.

According to this configuration, it is possible to embody the refrigerant recovery management system 500 by using the server different from the recovery server 510, the treatment server 520, and the management server 530.

(5-5) Other Modifications

In the foregoing embodiment and Modifications 1A to 1D, the refrigerant recovery practitioner C is an owner of a tank. Alternatively, the refrigerant treatment practitioner R may be an owner of a tank. In this case, the refrigerant treatment practitioner R lends an empty tank for refrigerant recovery to the refrigerant recovery practitioner C. The refrigerant treatment practitioner R then receives from the refrigerant recovery practitioner C the tank filled with a refrigerant recovered from refrigerant-use equipment of a user. In addition, the refrigerant treatment practitioner R lends a tank filled with a recycled refrigerant to a refrigerant filler. The refrigerant treatment practitioner R then receives from the refrigerant filler the tank that is empty since the recycled refrigerant is fed to refrigerant-use equipment of a user. Also in this case, the refrigerant recovery practitioner C may be the same as the refrigerant filler.

In the foregoing embodiment and Modifications 1A to 1D, a refrigerant recovery fund is allocated as a budget every year in a country or a region. Alternatively, the manager M may collect a refrigerant recovery fund from the refrigerant dealer.

In the foregoing embodiment and Modifications 1A to 1D, the servers are connected to one another via the network to exchange data with one another. Alternatively, one of the servers may access a different one of the servers. For example, the refrigerant recovery management system 100 according to the foregoing embodiment may have a configuration in which the refrigerant recovery practitioner C is capable of accessing the treatment server 20 or the management server 30.

In the foregoing embodiment and Modifications 1A to 1D, the manager M gives a consideration to each of the refrigerant recovery practitioner C and the refrigerant treatment practitioner R. Alternatively, the manager M may give to the refrigerant recovery practitioner C a consideration including a consideration to be given to the refrigerant treatment practitioner R and, thereafter, the refrigerant recovery practitioner C may give the consideration to the refrigerant treatment practitioner R.

In the foregoing embodiment and Modifications 1A to 1D, each of the request generation unit and the report generation unit generates electronic data. Alternatively, each of the request generation unit and the report generation unit may be configured to create a paper document such as a slip of paper. For example, the refrigerant recovery management system 100 according to the foregoing embodiment may have a configuration in which the request generation unit 11 generates a request slip, and the refrigerant recovery practitioner C sends a tank filled with a recovered refrigerant to the refrigerant treatment practitioner R with the request slip attached to the tank.

The foregoing description concerns embodiments of the disclosure. It will be understood that numerous modifications and variations may be made without departing from the gist and scope of the disclosure in the appended claims.

The present invention is widely applicable to refrigerant recovery management systems.

What is claimed is:

1. A refrigerant recovery management system comprising:
a display; and
at least one computer that executes a data input program to present a screen on the display, the screen being configured for a user to input at least a refrigerant type and a weight of a refrigerant that has been recovered from refrigerant use equipment and is to be sent to a refrigerant treatment practitioner that conducts a refrigerant treatment on the refrigerant,
the at least one computer being configured to:
generate request data for sending the refrigerant to the refrigerant treatment practitioner, the request data including information regarding the refrigerant type and information regarding the weight of the refrigerant
generate report data regarding the refrigerant treatment for reporting the refrigerant treatment to a manager that manages refrigerant recovery, the report data including information regarding the refrigerant type and information regarding the weight of the refrigerant, and determine a conformity between the request data and the report data by determining whether the information regarding the refrigerant weight included in the request data agrees with the information regarding the refrigerant weight included in the report data and determining whether the information regarding the refrigerant type included in the request data agrees with the information regarding the refrigerant type included in the report data.

2. The refrigerant recovery management system according to claim 1, wherein
the refrigerant treatment includes at least recycling the refrigerant, destruction of the refrigerant, and storage for the destruction of the refrigerant.

3. The refrigerant recovery management system according to claim 1, wherein
each of the request data and the report data further includes information regarding an amount of the refrigerant.

4. The refrigerant recovery management system according to claim 1, wherein
the request data further contains information regarding identification of refrigerant recovery equipment for sending the refrigerant to the refrigerant treatment practitioner.

5. The refrigerant recovery management system according to claim 1, wherein
the request data further contains information regarding identification of a refrigerant recovery practitioner that sends the recovered refrigerant to the refrigerant treatment practitioner.

6. The refrigerant recovery management system according to claim 1, wherein
the report data further contains information regarding the refrigerant treatment practitioner.

7. The refrigerant recovery management system according to claim 1, wherein
the at least one computer is further configured to perform an allocation of a consideration for the refrigerant recovery performed based on the conformity, the allocation being taken from a consideration for refrigerant recovery accumulated by the manager.

8. The refrigerant recovery management system according to claim 7, wherein
the at least one computer is further configured to allocate the consideration for the refrigerant recovery performed to the refrigerant recovery practitioner and the refrigerant treatment practitioner.

9. The refrigerant recovery management system according to claim 2, wherein
each of the request data and the report data further includes information regarding an amount of the refrigerant.

10. The refrigerant recovery management system according to claim 2, wherein
the request data further contains information regarding identification of refrigerant recovery equipment for sending the refrigerant to the refrigerant treatment practitioner.

11. The refrigerant recovery management system according to claim 2, wherein
the request data further contains information regarding identification of a refrigerant recovery practitioner that sends the recovered refrigerant to the refrigerant treatment practitioner.

12. The refrigerant recovery management system according to claim 2, wherein
the report data further contains information regarding the refrigerant treatment practitioner.

13. The refrigerant recovery management system according to claim 3, wherein
the request data further contains information regarding identification of refrigerant recovery equipment for sending the refrigerant to the refrigerant treatment practitioner.

14. The refrigerant recovery management system according to claim 3, wherein
the request data further contains information regarding identification of a refrigerant recovery practitioner that sends the recovered refrigerant to the refrigerant treatment practitioner.

15. The refrigerant recovery management system according to claim 3, wherein
the report data further contains information regarding the refrigerant treatment practitioner.

16. The refrigerant recovery management system according to claim 4, wherein
the request data further contains information regarding identification of a refrigerant recovery practitioner that sends the recovered refrigerant to the refrigerant treatment practitioner.

17. The refrigerant recovery management system according to claim 4, wherein
the report data further contains information regarding the refrigerant treatment practitioner.

18. The refrigerant recovery management system according to claim 5, wherein
the report data further contains information regarding the refrigerant treatment practitioner.

* * * * *